United States Patent [19]

Kojima et al.

[11] Patent Number: 5,283,667
[45] Date of Patent: Feb. 1, 1994

[54] ELECTRONIC FILING APPARATUS PROVIDED WITH A MULTIPLE PROCESSING FUNCTION WHEN IMAGE DATA IS DISPLAYED

[75] Inventors: Yoko Kojima, Yokohama; Keiichi Suzuki, Tokyo, both of Japan

[73] Assignee: Ricoh Company, Ltd., Japan

[21] Appl. No.: 625,661

[22] Filed: Dec. 12, 1990

[30] Foreign Application Priority Data

Dec. 18, 1989 [JP] Japan .............................. 1-328086
Dec. 20, 1989 [JP] Japan .............................. 1-330168
Sep. 12, 1990 [JP] Japan .............................. 2-241532

[51] Int. Cl.$^5$ ..................................... H04N 1/40
[52] U.S. Cl. ..................................... 358/462; 358/427; 358/426; 358/448; 358/467; 358/403; 358/404; 358/444; 358/452
[58] Field of Search ............ 358/462, 468, 427, 448, 358/444, 426, 261.1, 261.2, 261.3, 261.4, 467, 403, 452

[56] References Cited

U.S. PATENT DOCUMENTS

| | | | |
|---|---|---|---|
| 4,668,995 | 5/1987 | Chen et al. | 358/462 |
| 4,741,047 | 4/1988 | Sharpe, II | 358/462 |
| 4,901,163 | 2/1990 | Tsujioka et al. | 358/471 |
| 4,914,524 | 4/1990 | Kimura | 358/457 |
| 4,965,744 | 10/1990 | Wagatsuma et al. | 358/452 |
| 5,001,576 | 3/1991 | Tanaka et al. | 358/462 |

Primary Examiner—Edward L. Coles, Sr.
Assistant Examiner—Fan Lee
Attorney, Agent, or Firm—Mason, Fenwick & Lawrence

[57] ABSTRACT

When data read by a scanner or the like is to be displayed on the screen of a display device, the present invention is an electronic filing apparatus that uses either simple decimation processing or OR decimation processing depending upon whether the image data is images of character and line images, or dither images such as photographs, and performs the multiple processing suitable for the type of image, and uses a method whereby the multiple processed image data is stored in an optical disk or the like, a method where only the data compressed source image data is preserved in an optical disk, specifies the type of data of the image data from a keyboard for the type of data stored in the storage device and performs read from the storage device, multiple processing depending upon the type of data, transfers the converted data to a video memory, decodes that image data in accordance with the necessity of referral and display, and displays it on the display apparatus.

18 Claims, 8 Drawing Sheets

ELECTRONIC FILING APPARATUS PROVIDED WITH A MULTIPLE PROCESSING FUNCTION WHEN IMAGE DATA IS DISPLAYED

BACKGROUND OF THE INVENTION

The present invention relates to an improved electronic filing apparatus provided with a multiple (reduction and enlargement) processing function for when various types of image data are displayed in personal computers, office computers, word processors, desk type publishing, data processing and the like.

In particular, the present invention judges whether source image data is a character and line image or a dither image such as a photograph and the like when source image data read by an image scanner into a CRT (cathode ray tube) or the like having a different degree of resolution, is multiplied and displayed and performs multiple processing using an optimum decimating method, and relates to an electronic filing apparatus for displaying an image by means of an optimum multiple processing method corresponding to the type of simultaneously read source image data.

An image data processing system for a conventional personal computer or the like uses an image scanner or the like to read image data of documents that are the object for filing display. The source data is image data that has given data compression processing and converted into binary image data. The converted image data is stored in a storage device such as an optical disk or the like and is read from the storage device in accordance with the necessity of referral or display, and is displayed on the display screen of a display means such as a CRT or the like after processing to decode the data.

The binary image data that has been read by an image scanner is stored in an image memory, and at the same time, multiple processing is performed so as to correspond to the degree of display resolution so that it can be displayed on the display screen of a display means such as a CRT or the like and transferred to the video memory.

The reason for the multiple processing described above is because it is necessary to have multiple processing corresponding to respective display devices when all binary image data read by an image scanner is to be displayed by a display means such as a CRT or the like.

The following is a description of an electronic filing apparatus using a conventional method. In this example, the description will include using a personal computer to perform read of image data from a document, the reading of the image data, the performing of multiple processing for the read image, and the final display on a CRT.

Figure 1:
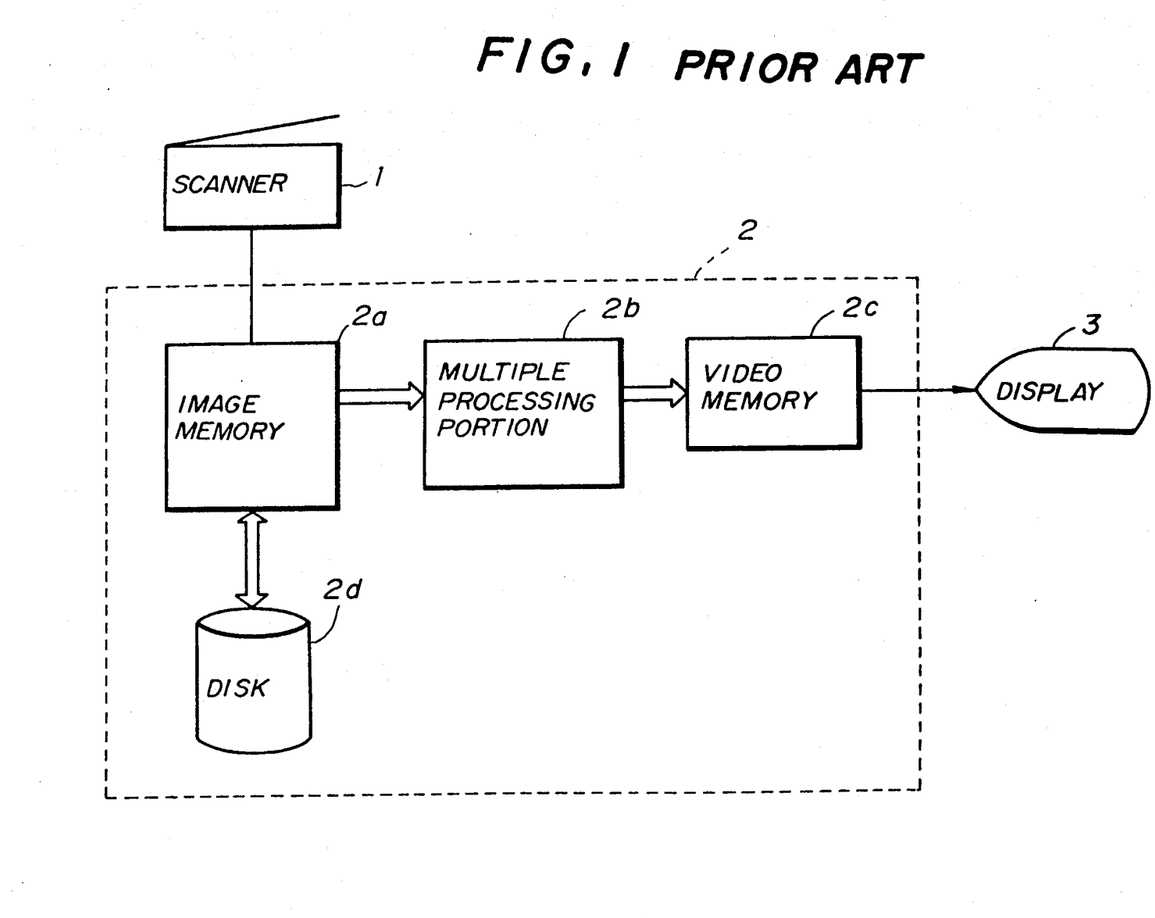
FIG. 1 is a functional block diagram of a configuration of the major portions of an electronic filing apparatus provided with a conventional image data processing function.

FIG. 1 is a functional block diagram showing the configuration of the major portions of an electronic filing apparatus using a conventional method. The major portions described here are an image scanner 1, an image data processing portion 2 and a display portion 3. Of these, the image data processing portion 2 comprises an image memory 2a, a multiple processing portion 2b, a video memory 2c and a disk apparatus 2d.

The image scanner 1 reads the image data into the image data processing portion 2. The image data is stored in the image memory 2a of the image data processing portion 2.

Figure 2:
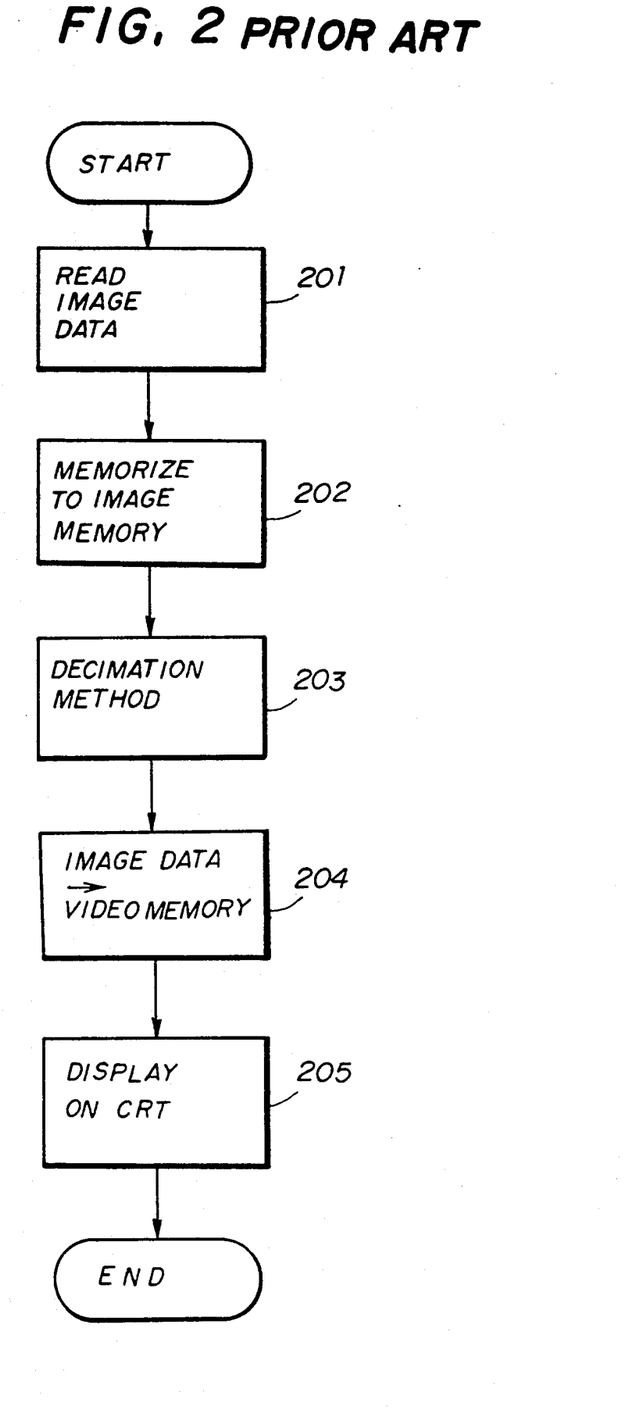
FIG. 2 is a flowchart showing the operation that performs the display of image data in a conventional electronic filing apparatus.
Figure 3:
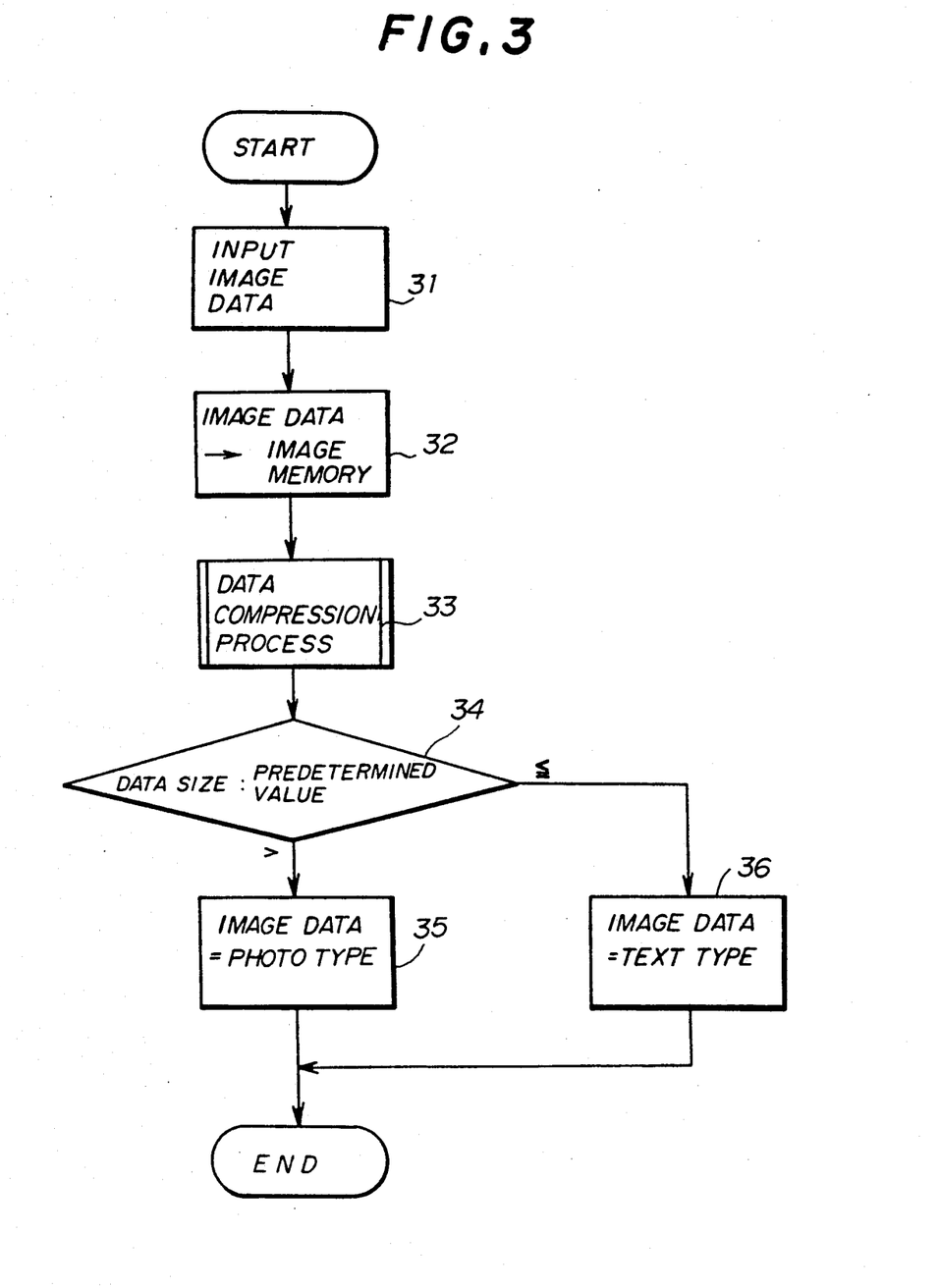
FIG. 3 is a block diagram that shows the configuration of the main portions of an electronic filing apparatus according to a first embodiment of the present invention.

Here, for example, the degree of resolution of binary image data read by the image scanner 1 is 300×300 (dpi: dots per inch). When this image data is output to the display portion 3 (CRT), it is necessary to perform multiple processing to 1/(3×3). The multiple processing of this image data is performed by the multiple processing portion 2b. The image data for which multiple processing has been performed is transferred to the video memory 2c. This data is then displayed on the display portion 3. FIG. 2 is a flowchart for the multiple processing when there is image data display for a conventional electronic filing apparatus.

First, the (300 dpi) document image data is read by an image scanner 1 (step 201). The read image data is then stored in an image memory 2a of a image data processing portion 2 (step 202). Then, the 300 dpi image data stored in the image memory 2a is multiple processed to a display resolution of 100 dpi by either the simple decimation method or the OR decimation method (step 203). The image data that is multiple processed in step 203 is transferred to the video memory 2c and stored (step 204). It is then displayed on the CRT of the display portion 3 (step 205). The image data multiple processing of the steps 201 through 205 described above then ends.

In conventional multiple processing, either the simple decimation method or the OR decimation method is used to perform the multiple processing. In the case of simple decimation processing, when the degree of resolution is reduced by a multiple of 1/n, the n (dots)×n (lines) of the source image data is created as data where single dots (or lines) of the image data are sampled and multiple processed to create the data. This simple decimation processing has simple multiple processing and has the merit that it can be executed in a short time. However, when the source data is continuous data such as characters or line images, fine portions are chopped and there is the problem that there are portions which are not displayed on the screen of the CRT.

On the other hand, with OR decimation processing, the data having n (dots)×n (lines) of the source image data has single dots (or single line) calculated by OR arithmetic and multiple processing performed to create the data. This processing method differs from the simple decimation processing described above in that there is no chopping of the fine portions of characters or line images. However, when photographic images (dither images) in which the source image data uses the dither method, all of the image data for display after OR decimation processing becomes blacker (as the image is destroyed) and so it is not suitable for display on a screen.

Each of the processing methods therefore has its respective disadvantages and normally only one of the two types of multiple processing is suitable for a single electronic filing system. It is only possible for a device to be designed so that it can use only one multiple processing method. Since only one decimation processing method can be used whether the image data read by an image scanner is character, line image or some other image, or whether it is a photograph (dither image) and so it is not possible to obtain the optimum display corresponding to the type of the read image data.

SUMMARY OF THE INVENTION

Accordingly, it is a general object of the present invention to provide an electronic filing apparatus provided with a multiple processing function for the display of image data and which is effective in eliminating the problems described above for the conventional apparatus.

A more specific object of the present invention is to enable image display at high quality by performing image data display by the optimum multiple processing corresponding to whether the image data read by an image scanner is character, line image or some other image, or whether it is a photograph (dither image).

These objects can be achieved by a configuration comprising an image input means to read images of characters and lines and dither image, an image input memory means to store image data read by the image input means, a data compression means to compress image data stored in the image memory means, a first storage means to store image data and external information in a disk apparatus, a first decimation means to perform simple decimation processing of image data stored in an image memory means, a second decimation means to OR decimate image data stored in the image memory means and generate data for display, a decoding means to decode image data that has been compressed by the data compression means, an image data processing means to perform compression and editing for the generation and display of image data, an image data display means to display on a screen the image data that has been edited by the image data processing means, a compressed data comparison means to compare the size of image data compressed by the data compression means with a reference value that has been set beforehand, a second storage means that stores the image data that has been processed by either the first decimation means or the second decimation means, and a central processing unit to control each of these means, and wherein, when image data for display on the screen of the display means is created and stored, that image data is input by the image input means and the input image data is stored in the image memory means, compressed by the data compression means and stored in the first storage means and at the same time, the image data that has been compressed by the compressed data comparison means is compared with a reference value and multiple processing is performed for the source image data by the first decimation means when the size of the compressed image data exceeds the reference value, and multiple processing is performed by the second decimation means when the size of the compressed image data is equal to or less than the reference value, and stored in the second storage means.

These objects can be achieved by a configuration comprising an image input means to read image data, an image memory means to store image data read by an image scanner, a mode information input means to input mode information for whether a type of image data is a binary image mode such as characters and line images or of a dither image mode such as photographs and the like when image data is read by an image scanner, a mode information storage means to store mode information from the mode information input means, a multiple processing selection means to select the type of multiple processing of the multiple processing means by the mode information of the mode information storage means, a multiple processing means to multiply the image data according to either the simple decimation method or the OR decimation method depending upon the degree of display resolution of the display means, a display means to display the image data, and a storage means to store the mode information of the mode information storage means and the data of the image memory means, and wherein, when when image data is read, the mode information of the image data that is the object of read is input by the mode information input means, and when the mode information is stored in the mode information storage means, multiple processing is performed to multiply the image data according to either the simple decimation method or the OR decimation method depending upon the mode information, and the multiple processed image data is stored in the video memory, and the image data of the video memory is displayed by the display means.

DESCRIPTION OF THE PREFERRED EMBODIMENTS

The following is a description of the electronic filing apparatus providing with a multiple processing function when image data is displayed. In order to facilitate understanding, the description will start from the principle of operation for judging the type of image data.

First, the reason it is necessary to judge the image data is to know the type of image data in order to determine whether the simple decimation method is to be applied with respect to photo type or whether the OR decimation method is to be applied with respect to data of the text type and thus select the processing corresponding to each data.

The image data that is given multiple processing and displayed is judged as either text type data such as characters and line images or photo type data such as dither images of photographs and the like.

First, the image data of the document is read by an image scanner (step 31), and stored in an memory (step 32). In the following step 33, compression processing is performed for the data stored in step 32. The compression processing of this image data can be one of the two patterns of the MH (Modified Huffman) coding method or the MR (Modified Relative Element Address Designate). Either one of these two methods is used to perform the compression of the image data. When this is done, image data of the text type often has many continuous space portions and places where there are characters, when compared to the image data of the photo type.

For example, when it is converted into binary data, image data of the text type has much continuous image data of the same type where there is continuous "1" for black and continuous "0" for white. Accordingly, when data compression by coding is performed, the size of image data of the text type becomes extremely small.

On the other hand, when image data of the photo type is converted into binary data for halftones of photographs and the like, it becomes data of dither images and differs from image data of the text type in that there are very few portions where there are continuous "1" for black and continuous "0" for white, and so the data configuration has a random nature. Accordingly, when data compression by coding is performed, the size of image data of the photo type is relatively large (step 33).

The predetermined value and the data size obtained by compression processing in step 33 are compared (step 34) and as a result, the data is judged as the photo type if the data size is larger than a predetermined value and the data is judged as the text type if the data size is less than a predetermined value (step 36). This is because the compression efficiency is better for text type data than it is for photo type data.

Figure 4A:
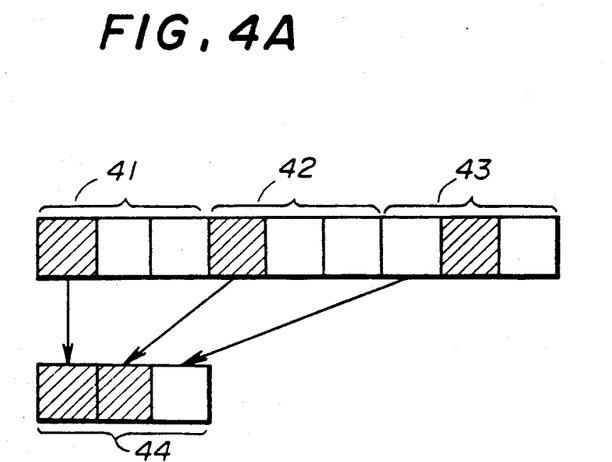
FIGS. 4A-B is a diagram describing the status of the decimation processing if image data of the text type and the photo type, for the present invention.

Following this, the results of the judgment for whether the image data input by the compression processing described above is text data or photo type data are used to perform the decimation processing most suitable for the type of data. Image data of the text type is reduced by the OR decimation processing and image data of the photo type is reduced by simple decimation processing. FIG. 4 shows the status for the decimation processing of this image data. Image data of the photo type is shown in FIG. 4A and image data of the text type is shown in FIG. 4B.

For example, when image data of the photo type is decimated to reduce it from 300 dpi to 100 dpi, the first bit is read from the 3-bit bit array 41,42,43 and "1" is set in the bit array 44 if the binary data is black, and "0" is set in the bit array if the binary data is white. If the information that the first bit of the bit array 41 is black, the first bit of the bit array 42 is also black and the first bit of the bit array 43 is white is decimated in bit array 44 and set, the contents of the reduced 3-bit bit array 44 are black,black,white and become "1", "1" and "0". As a result the average decimation processing is performed with respect to the image data.

Figure 4B:
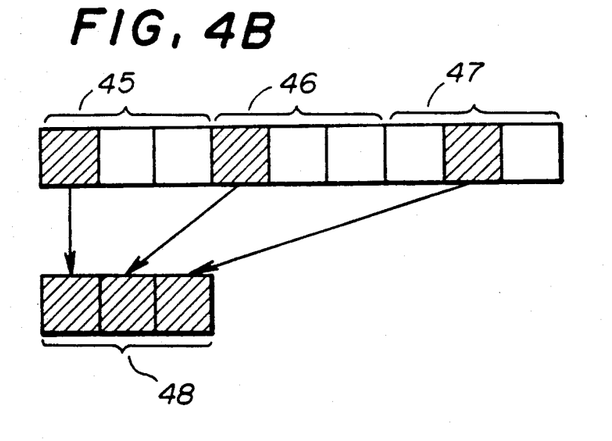

In the same manner, when the image data of the text type is reduced to ⅓, then as shown in FIG. 4B, even if there is one bit in the 1-bit array which is black "1", then OR decimation is performed to make the value of 1 bit "1" after decimation. As a result, there is no chopping of fine portions of characters and line images in the resultant source image data.

Figure 5:
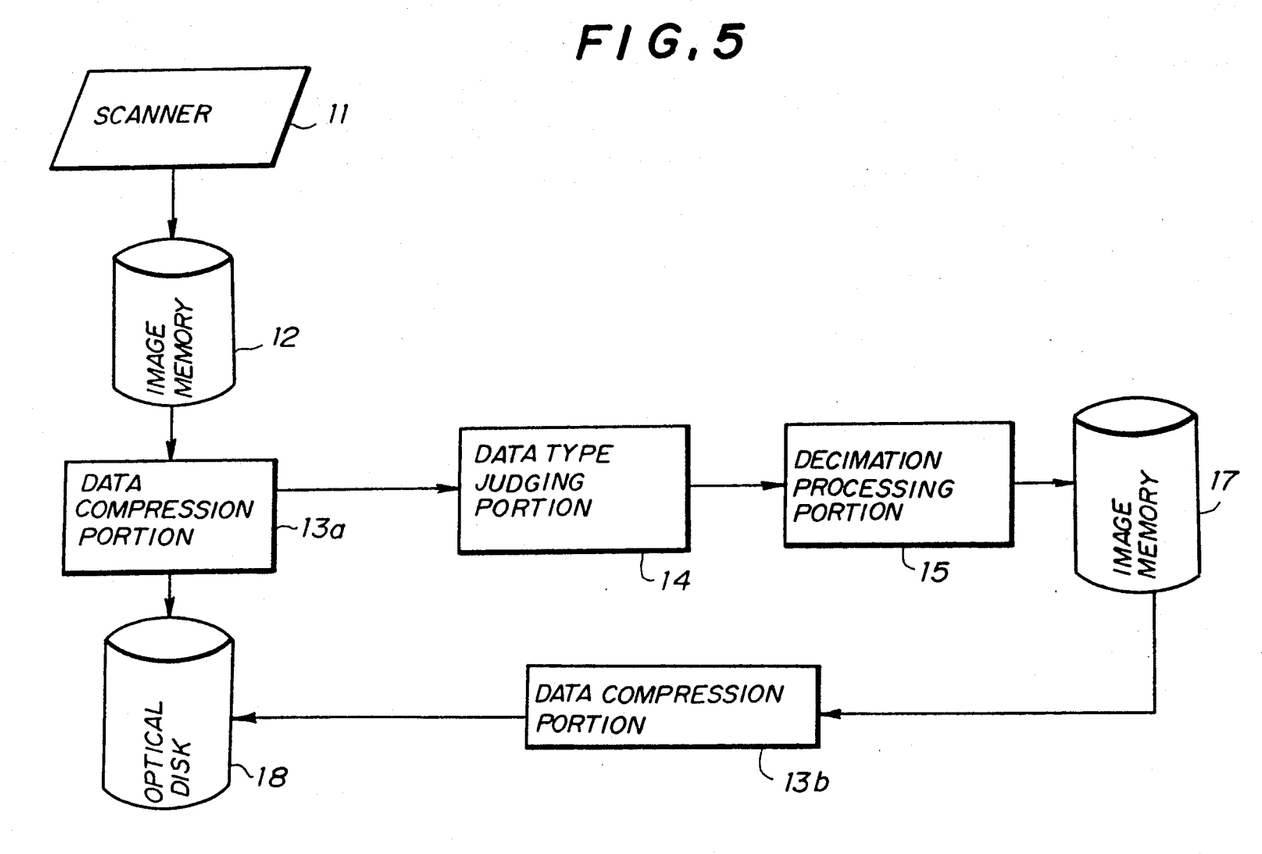
FIG. 5 is a functional block diagram showing the configuration relating to the operation for storing the image data in the first embodiment according to the present invention.

The following is a description of a first embodiment according to the present invention. FIG. 5 is a functional block diagram showing the configuration relating to the operation for storing the image data in the first embodiment according to the present invention. The main portions of the electronic filing apparatus are an image scanner 11, a source data image memory 12, a first data compression portion 13a, a second data compression portion 13b, an image data type judging portion 14, a decimation processing portion 15, an image memory 17 and an optical disk apparatus 18. In FIG. 5, the data compression portion 13 is shown as being divided into two portions but this is only for the purpose of description, and it can be in only one portion in actuality.

First, the image scanner 11 reads the image that is the object of display. This image scanner 11 has a read function that reads images such as characters and line images and the like as normal binary data and halftone images such as photographs and the like as binary data expressed as pseudo-halftones by the dither method.

Following this, the binary data that has been read from the image scanner 11 is stored in the source data image memory 12. For example, the image data of the source data image memory 12 is data with a high image density such as a degree of display resolution of 300 dpi. This data is compressed by the first data compression portion 13a into coded data and transferred to an optical disk apparatus 18 and stored.

When this is done, the image data type judging portion 14 performs a judgment for the type of image data so that the reduced image data can be displayed on the screen of a CRT, and the method of judgment is to set a reference value corresponding to a predetermined size and compare the compressed image data with a reference value. As the result of comparison, it is judged that the image data is of the photo type when the size of the image data that has been data compressed is larger than the reference value, and so it is reduced by simple decimation processing in the decimation processing portion 15 and stored in the image memory 17. Also, it is judged that the image data is of the text type when the size of the image data that has been data compressed is smaller than the reference value and so it is reduced by OR decimation processing in the decimation processing portion 15 and stored in the image memory 17.

When the source data is displayed on the CRT, the source data that has been compression processed by the optical disk apparatus 18 and is currently stored is read in accordance with the necessity of refer or display and the like and when it is, is decimated and a long time is taken for processing if it is to be displayed on the display screen of a display means such as a CRT, and the processing speed drops.

Therefore, image data of the photo type and which has been given simple decimation processing and stored in the image memory 17 is compressed by the second data compression portion 13b. The image data of the photo type is stored in the optical disk apparatus 18 as source image data and also as data for display.

On the other hand, image data of the text type and which has been given OR decimation processing and stored in the image memory 17 is compressed by the second data compression portion 13b and is stored on an optical disk apparatus 18 as source image data and as data for display.

By this, it is possible for this embodiment to select the optimum multiple method for multiple processing when there is to be output to a display means such as a CRT or the like by judging whether the contents of a document read by an image scanner 11 are dither images with pseudo-halftones for photographs and the like, or images of characters and line images and the like. In addition, the image data that is multiple processed in order to display it on a CRT screen is created separately from the source image data and stored in the optical disk apparatus 18. Accordingly, the optical disk apparatus 18 quickly performs the screen display of image data since both the image data that has been processed for CRT display purposes and the image data for electronic file purposes are stored in the optical disk apparatus 18.

The following is a description of a second embodiment according to the present invention. This second embodiment differs from the first embodiment in that only the source image data that is data compressed is stored in the optical disk apparatus. When the image data is to be displayed on the screen of a CRT or the like, the source image data that is data compressed has the size of the data compared with a reference value an multiple processing corresponding to either the text type of image data or the photo type of image data performed.

Figure 6:
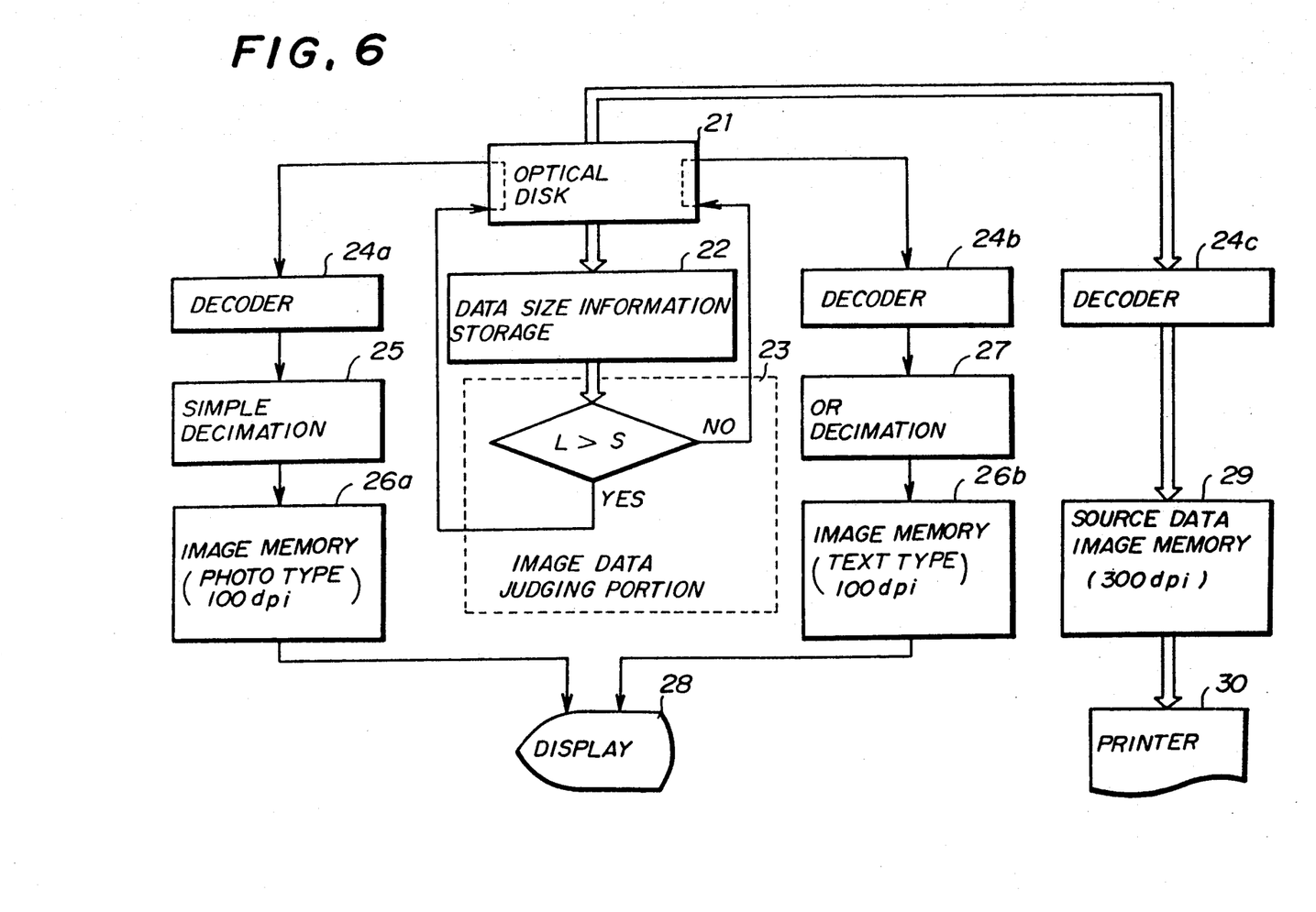
FIG. 6 is a block diagram that shows the configuration of the main portions of an electronic filing apparatus according to a second embodiment of the present invention.

FIG. 6 is a block diagram that shows the configuration of the main portions of an electronic filing apparatus according to a second embodiment of the present invention.

The configuration of the electronic filing apparatus of the second embodiment comprises an optical disk apparatus 21, a source data compression data size information storage portion 22, an image data type judging portion 23, a first decoder 24a, a second decoder 24b, a third decoder 24c, a simple decimation processing portion 25, an image memory 26a that stores the image data of the processing type which has been simple decimated, an image memory 26b that stores the image data of the processing type which has been OR decimated, an OR decimation portion 27, a display apparatus 28 such as a CRT or the like, a source data image memory 29 and a printer 30. In FIG. 6, the three decoders 24a, 24b and 24c are shown as being divided into three for the purposes of description but in actuality, can be provided at only one place. For the same reason, the image memories 26a and 26b for storing the decimated image data of the text type and the photo type are shown as being divided into two but in actuality, only one need be provided at one place.

The optical disk apparatus 21 stores the source image data that has been data compressed.

The source data compression data size information storage portion 22 reads the compression data size information for the source image data from the optical disk apparatus 21 when there is to be display, and stores it.

The image data type judging portion 23 compares the size of the compression data stored in the source data compression data size information storage portion 22, with a reference value. As the result, the image data type judging portion 23 judges that the image data is of the photo type if the size of the data compressed image data is greater than a reference value. Following this, the compressed data for the source data is read from the optical disk apparatus 21 and after decoding by the first decoder 24a is multiple processed by the simple decimation processing portion 25, stored in the image memory 26a and displayed on the screen of a display apparatus 28 such as a CRT or the like.

On the other hand, the image data type judging portion 23 compares the size of the compression data stored in the source data compression data size information storage portion 22, with a reference value. As the result, the image data type judging portion 23 judges that the image data is of the text type if the size of the data compressed image data is equal to or less than a reference value. In this case, the compressed image data read from the optical disk apparatus 21 is decoded by the second decoder 24b and is multiple processed by the OR decimation processing portion 27, stored in the image memory 26b and displayed on the screen of a display apparatus 28 such as a CRT or the like.

In addition, when a hard copy of the source image data that has been data compressed is made, that image data is decoded by the third decoder 24c, stored in the image memory 29 for the source data and output to the printer 30.

In this second embodiment, only the data compressed source image data is stored and so a smaller memory capacity is required.

Figure 7:
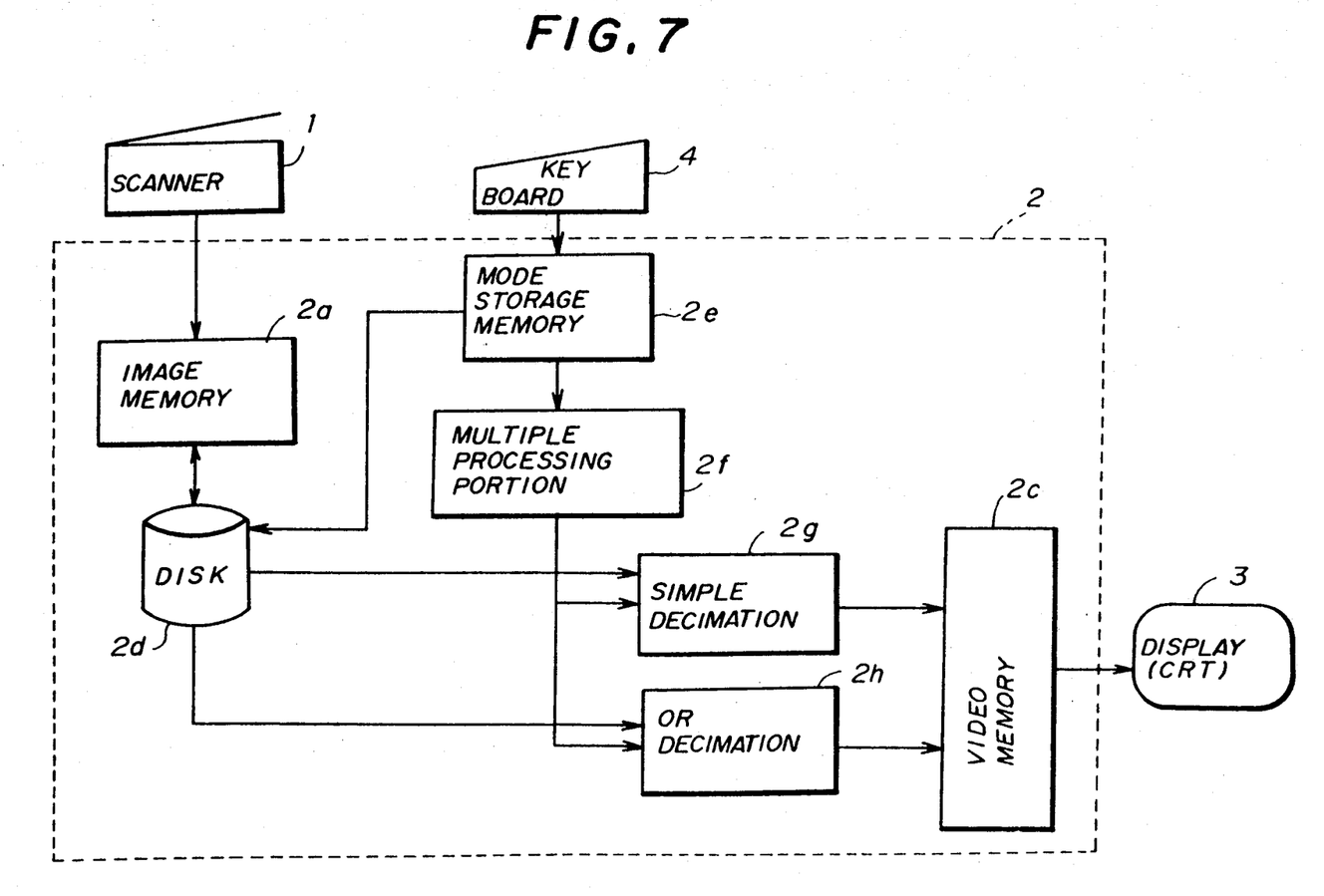
FIG. 7 is a block diagram that shows the configuration of an electronic filing apparatus according to a third embodiment of the present invention.

The following is a description of a third embodiment according to the present invention. When image data read is performed, this embodiment allows the keyboard input of mode information for whether the image data is of the character mode/line image mode or of the photograph (dither image) mode, and that information is stored in a memory, and either simple decimation processing method or OR decimation selected when there is display. FIG. 7 is a block diagram that shows the configuration of an electronic filing apparatus according to a third embodiment of the present invention. In FIG. 7, portions that correspond to similar portions in FIG. 1 are indicated with the same numerals.

The configuration of the third embodiment comprises an image scanner 1, an image memory 2a, a video memory 2c, a disk 2d, a mode storage memory 2e, a multiple processing portion 2f, a simple decimation processing portion 2g, an OR decimation processing portion 2h, a display portion 3 and a keyboard 4.

Figure 8:
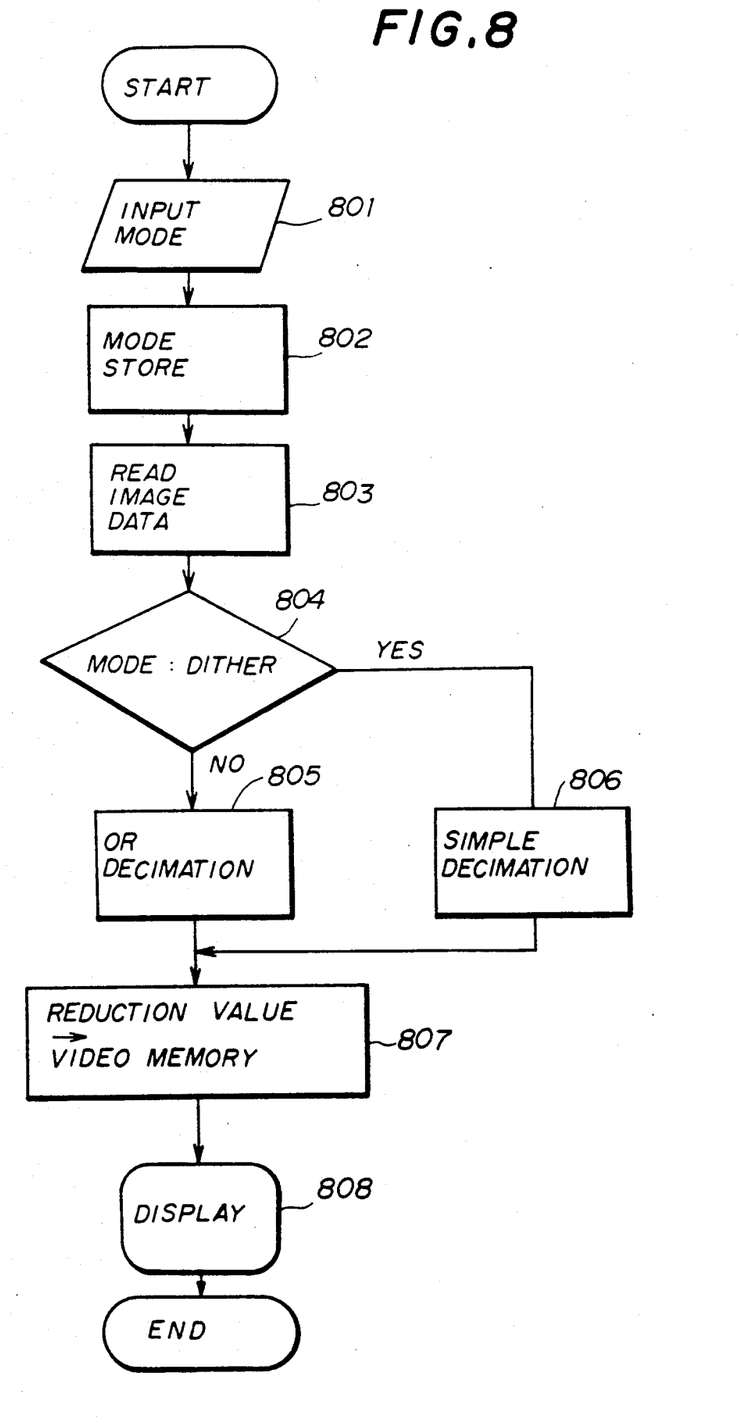
FIG. 8 is a flowchart showing the processing of an electronic filing apparatus according to a third embodiment of the present invention.

FIG. 8 is a flowchart showing the processing of an electronic filing apparatus according to a third embodiment of the present invention. Prior to the reading of the image data by the image scanner 1, the operator selects mode information for whether the type of image data that is the object of processing is of the character mode/line image mode or of the photograph (dither image) mode, and inputs from the keyboard 4 (step 801). The mode information that is input from the keyboard 4 is stored in the mode storage memory 2e (step 802). Furthermore, the mode information is either the character mode/line image mode or the photograph (dither image) mode and is stored in the disk apparatus 2d and along with the image data corresponding to the attribute value of the image data. Following this, the image scanner 1 reads the image data and converts it into binary image data, and stores it in the image memory 2a (step 803). If the mode input from the keyboard in step 801 of the character mode/line image mode (step 804) then reduction of the image data is performed by OR decimation processing (step 805). Also, if the mode input from the keyboard in step 801 is the photograph (dither image) mode (step 804), then reduction of the image data is performed by simple decimation processing (step 806). The reduction value obtained by the decimation processing is transferred to the video memory 2c and then the data of the video memory 2c is displayed on the screen of the CRT of the display portion 3.

It is also necessary to preserve the image data stored in the image memory 2a. Accordingly, if the image data is to be stored in an optical disk or stored in a disk apparatus 2d such as a hard disk, the mode information stored in the mode storage memory 2e is also stored in the disk apparatus 2d along with the image data of the image memory 2a. In this manner, the mode information is appended to and stored with the image data that is to be stored, so that it is convenient when later refer and display of the data is performed, as well as for when there is image data read. The data of the disk apparatus 2d is read from the disk apparatus 2d and reproduced when the image data stored by the operator in the disk apparatus 2d is necessary, and when it is output to the display portion 3, the two decimation processing portions 2g, 2h perform decimation corresponding to the mode information that is appended to the image data.

Moreover, the method for the input of the mode information by step 801 of FIG. 8 can be a method where there is allocation to one of the function keys on the keyboard 4, or can be a method where item selection is displayed on the display portion 3 so that the operator indicates the appropriate item by a cursor.

Moreover, the value set as the reference value in the image data type judging portion 14 can be stored by software prior to performing the processing for judging the type of image data or can be set by the hardware. Furthermore, the reference value can also be set by keyboard input prior to reading the image data by a scanner.

The present invention is not limited to the specifically disclosed embodiments, and variations and modifications may be made without departing from the scope of the present invention.

What is claimed is:

1. An electronic filing apparatus provided with a multiple processing function, the apparatus comprising:
   an image input means for reading images of characters and line and dither images;
   an image input memory means for storing image data read by said image input means;
   a data compression means to compress image data stored in said image memory means in accordance with a particular type among a set of possible image data types, the data compression means including:
   1) first compression means for performing a first compression process on the image data; and
   2) second compression means for performing on the image data, a second compression process distinct from the first compression process;
   a first storage means to store image data and external information in a disk apparatus;
   a first decimation means for performing simple decimation processing of image data stored in said image memory means, and generating data for display in accordance with the particular type among the set of possible image data types;
   a second decimation means for OR decimating image data stored in said image memory means, and generating data for display in accordance with the particular type among the set of possible image data types;
   a decoding means for decoding image data that has been compressed by said data compression means;
   an image data processing means for performing compression and editing for said generation and display of image data;
   an image data display means for displaying on a screen said image data that has been edited by said image data processing means;
   a data comparison means for comparing (1) a size of said image data to be compressed by said data compression means with (2) a reference value that has been set beforehand;
   a second storage means for storing said image data that has been processed by said first decimation means or said second decimation means; and
   a central processing unit to control each of said means;
   wherein when image data for displaying on a screen of said display means is created and stored:
   1) the image data is input by said image input means and said input image data is stored in said image input memory means, compressed by said data compression means and stored in said first storage means; and, simultaneously,
   2) the image data that has been compressed by said data compression means is compared with a reference value, and:
      i) multiple processing of said source image data is performed by said first decimation means when a size of said compressed image data exceeds said reference value, and processed data is stored in said second storage means, and
      ii) multiple processing is performed by said second decimation means when the size of said compressed image data is equal to or less than said reference value, and processed data is stored in said second storage means.

2. The electronic filing apparatus provided with a multiple processing function for when image data is displayed, according to claim 1, wherein:
   when only source image data compressed by said data compression means is stored in said storage means, and said image data exceeds a reference value as the result of comparing said image data with a reference value by said compression data comparison means when there is to be display on said display means, said decoding means performs decoding processing and decimation processing is performed by said first decimation means, and when said image data is equal to or less than a reference value as the result of comparing said image data with a reference value by said compression data comparison means when there is to be display on said display means, said decoding means performs decoding processing and decimation processing is performed by said second decimation means.

3. The electronic filing apparatus with a multiple processing function for when image data is displayed, of claim 1, wherein:
   said data compression means uses coding to compresses image data read by an image input means.

4. The electronic filing apparatus provided with a multiple processing function for when image data is displayed, of claim 1, wherein:
   said data compression data comparison means reads size information for image data that has been compressed and stored in said storage means, said compressed data comparison means compares said size information and a reference value that has been set beforehand, and when a size of said compressed image data is greater than a reference value it is judged as image data for decimation by said first decimation means and when a size of said compressed image data is equal to or less than a reference value it is judged as image data for decimation by said second decimation means.

5. The electronic filling apparatus provided with a multiple processing function for when image data is displayed, of claim 1 wherein:
   said image input means reads image data that is to be displayed on said display means and character and line images are read as binary data and photograph halftone images are read as binary images expressed as pseudo-halftones by the dither method.

6. The electronic filing apparatus provided with a multiple processing function for when image data is displayed, of claim 1, wherein:
said image data display means reads image data that has been reduction processed and stored in said second storage means, and displays said image data on a screen.

7. The apparatus of claim 1, further comprising:
means for selecting one of the first and second compression means for performing on the image data, a respective one of the first and second compression processes.

8. The apparatus of claim 7, wherein the data comparison means outputs a comparison result determining whether the selecting means selects the first compression means or the second compression means.

9. The apparatus of claim 7, wherein the data comparison means includes means for determining whether the input image data is of:
a) a dither image type, such as photographs; or
b) a binary image type, such as characters or line drawings.

10. The apparatus of claim 9, wherein the means for selecting selects the first compression means to perform the simple decimation process when the input image data is of the dither image type such as photographs.

11. The apparatus of claim 9, wherein the means for selecting selects the second compression means to perform the OR decimation process when the input image data is of the binary image type such as characters or line drawings.

12. The apparatus of claim 9, wherein the means for selecting selects the first compression means to perform the simple decimation process when the input image data is of the dither image type such as photographs, and selects the second compression means to perform the OR decimation process when the input image data is of the binary image type such as characters or line drawings.

13. An electronic filing apparatus provided with a multiple processing function, the apparatus comprising:
an image input means for reading image data;
an image memory means for storing image data read by an image scanner;
a mode information input means for inputting mode information on whether a type of image data is (1) a binary image mode such as a character and line image or (2) a dither image mode such as photographs and the like, when image data is read by the image scanner;
a mode information storage means for storing mode information from said mode information input means;
a multiple processing selection means for selecting a type of multiple processing of a multiple processing means by said mode information of said mode information storage means;
said multiple processing means for performing multiple processing on said image data according to either (1) a simple decimation method or (2) an OR decimation method, depending upon a degree of display resolution of a display means associated with the apparatus;
the display means, for displaying said image data; and
a storage means to store said mode information of said mode information storage means and said data of said image memory means;
wherein:
when image data is read, mode information of said image data that is to be read is input by said mode information input means,
when said mode information is stored in said mode information storage means, multiple processing is performed on said image data according to either (1) the simple decimation method or (2) the OR decimation method, depending upon said mode information, so as to form multiple processed image data,
said multiple processed image data is stored in a video memory, and
said image data of said video memory is displayed by said display means.

14. The electronic filling apparatus provided with a multiple processing function for when image data is displayed, of claim 13, wherein:
when image data is read by said image data input means and transferred to said storage medium of a disk apparatus or the like, mode information input by said mode information input means when there is read is transferred to said storage medium along with image data.

15. The electronic filing apparatus provided with a multiple processing function for when image data is displayed, of claim 13, wherein:
said multiple processing selection means selects OR decimation processing when a character and line image mode is input by said mode information input means, and selects simple decimation processing when a photography mode is input.

16. The electronic filing apparatus provided with a multiple processing function for when image data is displayed, of claim 13, wherein:
when read image data is stored in said storage means, mode information is stored along with said image information as attribute information of said image data.

17. The electronic filing apparatus provided with a multiple processing function for when image data is displayed, of claim 13, wherein:
said display means reads image data of said video memory and displays it on a screen.

18. The electronic filing apparatus of claim 2, wherein:
said image input means reads image data that is to be displayed on said display means and character and line images are read as binary data and photograph halftone images are read as binary images expressed as pseudo-halftones by the dither method.

* * * * *